UNITED STATES PATENT OFFICE.

JOHANN ZELTNER, OF NUREMBERG, BAVARIA.

IMPROVEMENT IN MANUFACTURE OF VIOLET ULTRAMARINE.

Specification forming part of Letters Patent No. 207,836, dated September 10, 1878; application filed October 12, 1877.

*To all whom it may concern:*

Be it known that I, JOHANN ZELTNER, of Nuremberg, in the Kingdom of Bavaria, have invented an Improvement in Processes for the Production of Violet Ultramarine; and I do hereby declare that the following is a full, clear, and exact description of the same.

The following patents have been granted for the invention in foreign countries, dated as follows: England, dated 6th July, 1877; France, dated 5th July, 1877; Belgium, dated 11th July, 1877; Austria, dated 31st July, 1877; Italy, dated 30th September, 1877; Germany, dated 2d July, 1877.

This pigment is a violet ultramarine formed from blue and green ultramarine by oxidation and the action of water upon the said blue or green ultramarine, or a mixture thereof. The water which is absorbed by the said blue or green ultramarine to form the said violet ultramarine can only be removed therefrom by calcination. The said water, therefore, belongs to the constitution of the said violet ultramarine, and for this reason I call the said violet ultramarine "ultramarine hydrate."

In one method of carrying out my invention, I treat blue or green ultramarine heated to 300° Celsius with the gas of chlorine, or the gas of any other halogen, (as that of iodine or bromine,) and the resulting chlorine product (or other halogen product) is then changed into violet ultramarine (ultramarine hydrate) by heating it with water or solution of caustic alkali, washing out at the same time chloride of sodium, or other compound of a halogen with sodium, as the iodide or bromide. The said treatment with chlorine is conducted, preferably, in earthen retorts placed in ovens built of stone. In said retorts are placed earthen slabs or trays, about one centimeter in thickness, with legs or supports about five centimeters in height. These slabs are arranged in rows, and upon them is placed the blue or green ultramarine to be treated. Each retort is filled with the slabs or trays thus arranged one over another. The chlorine (or other halogen gas) is introduced into the retorts by earthen pipes, which convey said gas into the bottoms of said retorts, and the gas, rising through said retorts, finds exit at the top thereof through other earthen pipes leading into the chimney of the oven.

I generate chlorine in a well-known way, by the use of hydrochloric acid and black oxide of manganese, using for every one hundred parts, by weight, of ultramarine to be treated fifty parts, by weight, of the said black oxide and two hundred parts of dilute hydrochloric acid.

The retorts being heated to 300° Celsius, and the apparatus for generating the chlorine (which apparatus may be of any well-known or approved kind) being set up and put into operation, I conduct the gas into the said retorts until the development of the said chlorine gas ceases. The pigment or color is then removed from the retorts and stirred into boiling water (or a boiling weak solution of caustic soda—three kilograms of soda to one hundred kilograms of ultramarine) till the transformation into violet ultramarine is effected.

In a strictly analogous manner I may obtain violet ultramarine by using sulphuric anhydride vapors (instead of chlorine gas) at 150° Celsius, and subsequent treatment of the derivative with a caustic-soda solution, using the same oven and retorts for heating the blue or green ultramarine in contact with the said vapors, and any of the well-known apparatus for generating the said acid vapors; and this treatment with sulphuric acid in place of a halogen may constitute a modification of my process.

In a second modification of carrying out my invention, I heat blue or green ultramarine to from 150° to 180° Celsius, and simultaneously pass into the retorts chlorine gas and steam, whereby the final transformation into violet ultramarine takes place in the retort itself, using the same proportions of hydrochloric acid and black oxide of manganese as in the first-described method. But in this case I may use retorts or boxes of boiler-iron fitted into stone-built ovens, said boxes containing the earthenware slabs or trays hereinbefore described, intimate mixture of the chlorine gas and steam being obtained by passing said gas and steam into hollowed-out sandstones of twenty-liter capacity, provided with hermetically-sealed stone covers, into the bottoms of which stone vessels the gas and steam are conducted through earthen pipes, and from the covers of which lead pipes pass to the bottoms of the aforesaid iron boxes or retorts. From the tops of the said retorts earthen pipes lead to the chimney for the exit of vapors.

The iron boxes are heated till the temperature within them rises to from 160° to 180° Celsius. Then the chlorine gas and steam are admitted for two hours, more or less, or till the development of chlorine ceases, when the inclosed ultramarine is entirely changed into violet ultramarine. The product has then to be washed to remove the chloride of sodium, and finally to be rubbed or passed through any suitable mill to render it uniformly pulverulent, which fits it for the market and for use in the arts.

Another modification in the manner of carrying out the simultaneous action of chlorine gas and steam is to employ a sheet-iron drum for holding the ultramarine, said drum being heated in an iron oven to the aforesaid required temperature, into which drum the steam and chlorine gas are led through a hollow trunnion, vapors escaping from another hollow trunnion. A scraper attached to pipes passing through the trunnions keeps the material under treatment from sticking to the drum. These pipes, passing through the trunnions, are provided with stuffing-boxes containing hemp and compressed tallow.

Upon the fact that mixtures of sal-ammoniac and nitrates give reactions which are expressed in the following formulæ, I base a third modification of my method of procedure: $2H_4NNO_3 + H_4NCl_1 = 5N + 6H_2O + Cl$; or $2NaNO_3 + 3H_4NCl = 2NaCl + 5N + 6H_2O + Cl$.

It follows that these salts, heated to the proper temperature, will supply the chlorine and water necessary to convert the blue and green ultramarine heated to from 160° to 180° Celsius into violet ultramarine. As simultaneous reactions take place besides those enunciated in the above formulæ, I have found the proportions of six kilograms of the nitrate of soda and eight kilograms of the sal-ammoniac to be the most advantageous and correct for this purpose.

I thoroughly mix fourteen kilograms of the said mixture of nitrate of soda and sal-ammoniac with one hundred kilograms of blue or green ultramarine, and then place the mixture in earthen pots of about two liters capacity. The said pots are placed in a suitable oven and heated till the change from green or blue to violet ultramarine has taken place. To increase the intensity of the violet the operation may be repeated. In this mode of preparation ammonia becomes so firmly united with the violet ultramarine that it cannot be removed by boiling water or by boiling with alkaline solutions.

Instead of nitrate of soda, I may use any other nitrate mixed in the same way with sal-ammoniac.

I base a fourth modification of procedure upon the following reactions: If blue or green ultramarine be heated to a temperature of from 160° to 180° Celsius, and subjected to the united action of (a) an acid, (b) of a substance capable of oxidizing said ultramarine, and (c) of water, or if the said ultramarine be subjected to the united action of a mixture containing an acid, or means of oxidizing said ultramarine, and water, then a more or less complete transformation of the said blue or green ultramarine into violet ultramarine will be accomplished. Accordingly I produce this said transformation by introducing into the boxes described in the above second modification of procedure, and in which the said blue or green ultramarine is heated from 160° to 180° Celsius, the vapors of dilute nitric acid till the change is effected.

The same change may be effected by subjecting the ultramarine, heated as aforesaid in the aforesaid boxes, to the vapors of dilute nitric acid, or of any halogen hydrogen acid mixed with atmospheric air. During the escape of vapor from the heated ultramarine, sal-ammoniac is decomposed and chloride of sodium and ammonia are produced.

The transformation may also be effected by the use, in the same manner, of the mixed vapors of sal-ammoniac, steam, and air, while ammonia will be united with the violet-ultramarine product.

In carrying out my invention according to this fourth modification of procedure, I may also use one part of chloride of calcium in aqueous solution, or of chloride of magnesium in aqueous solution, mixed with one hundred parts of the blue or green ultramarine, and very slowly heat the mixture in porous earthen pots in a suitable oven, which will produce violet ultramarine, the intensity of the color being increased by a repetition of the operation.

I claim—

The herein-described process for the manufacture of violet ultramarine by the reaction upon blue or green ultramarine, or mixture thereof, of an oxidizing reagent and water, substantially as and for the purpose set forth.

JOH. ZELTNER.

Witnesses:
HEINR. SPANN,
FRIEDRICH BAUER.